United States Patent [19]

Missout et al.

[11] Patent Number: 4,635,430

[45] Date of Patent: Jan. 13, 1987

[54] DEVICE FOR DISPENSING OPTICAL FIBERS INTO HELICAL GROOVES OF A RING

[75] Inventors: Bernard M. Missout; Jean-Pierre Michaux; Jean-Luc Piova, all of Paris Cedex, France

[73] Assignees: Societe Anonyme de Telecommunications; Societe Industrielle de Liaisons Electriques, both of Paris, France

[21] Appl. No.: 739,062

[22] Filed: May 29, 1985

[30] Foreign Application Priority Data

May 30, 1984 [FR] France .................. 84 08533

[51] Int. Cl.⁴ .......................... G02B 6/10; G02B 6/16; G02B 6/04; H01B 13/02
[52] U.S. Cl. ............................... 57/6; 57/7; 57/9; 57/13; 57/293
[58] Field of Search .................. 57/6, 7, 9, 13, 15, 57/293

[56] References Cited

U.S. PATENT DOCUMENTS

| | | | |
|---|---|---|---|
| 4,154,049 | 5/1979 | King et al. | 57/9 |
| 4,195,468 | 4/1980 | King et al. | 57/9 |
| 4,237,687 | 12/1980 | DeVecchis et al. | 57/13 X |
| 4,309,864 | 1/1982 | Hulin | 57/6 |
| 4,384,446 | 5/1983 | Hope et al. | 57/6 |
| 4,483,134 | 11/1984 | McKay et al. | 57/9 X |
| 4,497,164 | 2/1985 | Dotti et al. | 57/13 X |

FOREIGN PATENT DOCUMENTS

| | | |
|---|---|---|
| 3930 | 9/1979 | European Pat. Off. . |
| 78213 | 5/1983 | European Pat. Off. . |
| 2388931 | 9/1977 | France . |
| 2121209 | 12/1983 | United Kingdom . |

Primary Examiner—John Petrakes
Attorney, Agent, or Firm—Laubscher & Laubscher

[57] ABSTRACT

There is provided a device for dispensing optical fibers into helical grooves of a ring drawn through optical fiber cabling lines. The dispensing device comprises a holder rotating about the ring and including conduits each containing a grooved fiber-guide receiving at least one optical fiber. The fiber-guides are arranged along generating lines of a cone coaxial with the ring and have first fiber-output ends designed to engage in the ring grooves. To disengage the first ends of the fiber-guides from the ring grooves while feeding the ring through the cabling line, the fiber-guides are slidably mounted in the conduits and the device comprises a nut means enclosing a washer in which second ends of the fiber-guides radially, thereby translationally moving the fiber-guides along generating lines of the cone respectively.

15 Claims, 19 Drawing Figures

DEVICE FOR DISPENSING OPTICAL FIBERS INTO HELICAL GROOVES OF A RING

BACKGROUND OF THE INVENTION

1. Field of the invention

The present invention relates to a device for dispensing optical fibers in helical grooves of a ring, intended for obtaining an optical fiber cable in a cabling line. The ring is drawn along the cabling line and runs in particular through a rotating holder carrying spools that pay out optical fibers towards fiber-guides in the dispensing device in which the fibers are lodged in the ring grooves prior to taping of the ring to hold the fibers in the grooves.

More particularly, the invention deals with a device for dispensing optical fibers in helical grooves of a ring comprising a holder rotating about the ring and including conduits each containing a hollow fiber-guide receiving at least one optical fiber. The fiber-guides are arranged along generating lines of a cone coaxial with the ring and have first fiber-output ends designed to engage in the ring grooves.

2. Description of the prior art

Such optical fiber dispensing devices are disclosed in French patent application No. 2,388,931, European patent application No. 0,003,930, and U.K patent application No. 2,121,209A corresponding to U.S. Pat. No. 4,497,164. The fiber-guides take the form of hollow capillary tubes secured in the fiber-guide holder by bonding in particular. The tubes have an inside diameter approximately equal to that of an optical fiber. The tubes are often clogged with dust causing an obstacle to optical fiber translation. The first ends of the capillary tubes are relatively resilient and curved in order to enter tangentially the ring grooves. The first ends of the capillary tubes are permanently arranged about a circle having a diameter smaller than the outside diameter of the ring such that the fiber-guide holder rotates about the ring in terms of the sometimes variable pitch of the helical grooves in the ring.

When a ring is red manually into the cabling line prior to any cabling operation as such, the first ends of the tubes must be carefully engaged in the ring grooves. The ring is then drawn for several meters up to a cable winding means at one end of the cabling line, after having run in particular through one or more taping units. The operation of manually drawing the ring requires some considerable effort to overcome the inertia of the fiber-guide holder that is rotationally driven as a result of the translational movement of the ring. Further, while the ring is being fed between the first ends of the fiber-guides and also during the cabling operations, the first ends of the tubes undergo excessive bending that can damage the fibers and adversely affect accurate penetration into the ring grooves.

In addition, the optical fibers unwound from the pay-out spools must be completely clear of the fiber-guides when the ring is fed therebetween. This means that the fibers must be relocated with respect to the ring grooves.

It is worth noting that the dispensing device is not mechanically linked to the fiber pay-out spool holder and is used also for slaving the rotational speed of the spool holder to the pitch of the ring grooves with the help of opto-electronic coupling means. The fiber-guides do not therefore become ideally positioned with respect to the pay-out spools until the cabling operation, and any manual operation or any difference between the rotational speeds of the spool holder and the fiber-guide holder results in undesirable twisting and bending in the fibers.

OBJECTS OF THE INVENTION

The main object of this present invention is therefore to obviate the foregoing drawbacks.

Another object of this invention is to provide an optical fiber dispensing device in which the first ends of the fiber-guides are disengageable from the ring grooves.

SUMMARY OF THE INVENTION

In accordance with the above objects, there is provided a device for dispensing optical fibers wherein the fiber-guides are slidably mounted in conduits of a holder rotating about the grooved ring. The device comprises means for imparting translational movement to the fiber-guides along generating lines of a cone coaxial with the ring respectively. Under these conditions, the fiber-guide holder and the ring can rotate with respect to each other when the first ends of the fiber-guides are disengaged from the ring grooves, particularly for penetrating the ring into the cabling line.

BRIEF DESCRIPTION OF THE DRAWING

Further advantages and features of this invention will be apparent from the following description of several embodiments of this invention with reference to the corresponding accompanying drawings in which.

DESCRIPTION OF THE PREFERRED EMBODIMENTS

Figure 1:
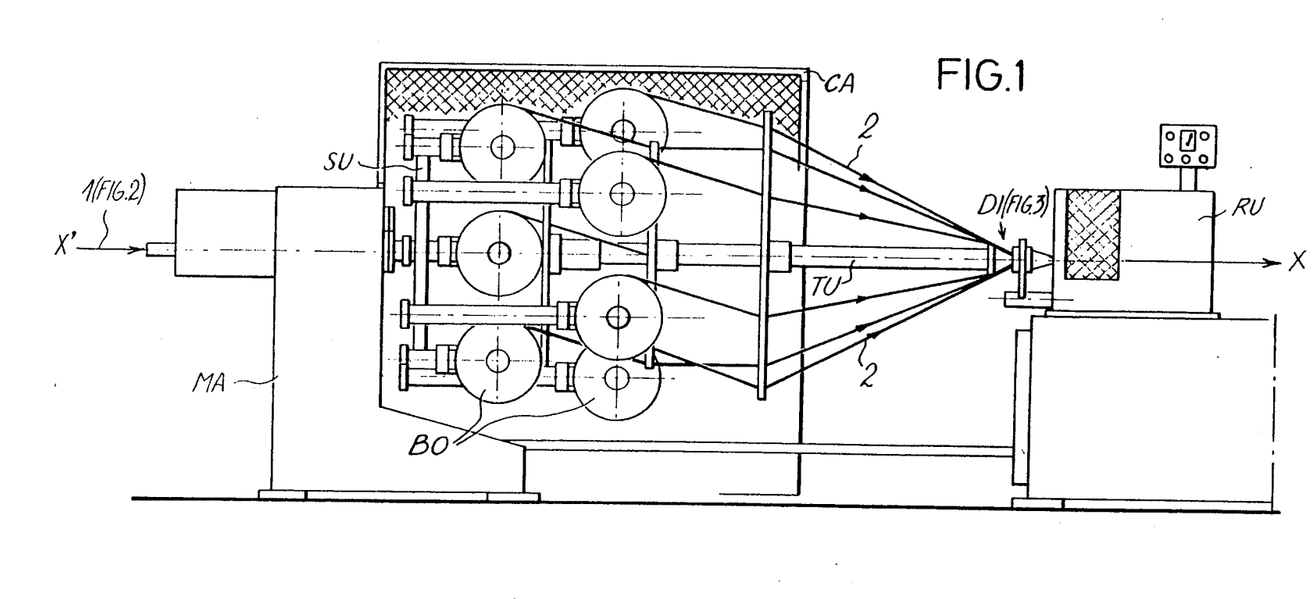
FIG. 1 is a vertical longitudinal view of a portion of an optial fiber cabling line including an optical fiber dispensing device embodying the invention.

As depicted schematically in FIG. 1, an optical fiber dispensing device DI is provided between a holder SU for fiber pay-out spools BO and at least one taping unit RU arranged along a longitudinal axis X'X of a cabling line. A grooved cylindrical ring 1 designed to form a central member of an optical fiber cable is freely drawn along an axis X'X, from the left side to the right side in FIG. 1. The spool holder SU rotates about the axis X'X in a protective cage CA. The dispensing device DI is mechanically linked in rotation to the spool holder SU by means of a tube TU through which ring 1 runs. Holder SU and dispensing device DI have a rotational speed slaved to a ring translational speed and, to be more precise, to a variable pitch of helical grooves in the ring by means of a slaving mechanism MA comprising a fingered bush engaging in ring grooves. Optical fibers 2 are unwound from the spools BO and dispensed into the ring grooves by means of the device DI, and then held freely therein by means of a protective sheathing enveloping the ring and closing off the grooves, as supplied by the taping unit RU.

Figure 2:
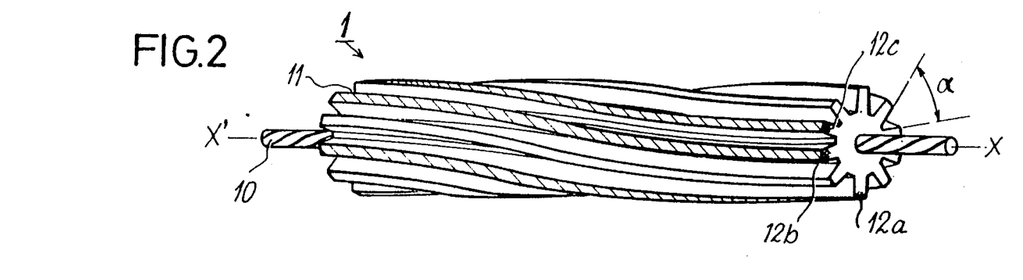
FIG. 2 shows a perspective section of a helically-grooved ring having three coloured ribs.

Ring 1 offers an elongated cylindrical structure made of extruded thermoplastic in which, preferably, is embedded a central strengthening member 10 such as a steel wire or several twisted steel wires, or any analogous reinforcement member, as shown in FIG. 2. Parallel helical grooves 11 are spaced out around the periphery of the ring 1. In the illustrated embodiment, there are provided N=10 peripheral grooves to each receive at least one optical fiber 2 unrolled from a respective spool BO and laid in the ring groove by means of dispensing device DI. Grooves 11 follow sometimes direct sometimes retrograde helical paths. The grooves are trapezoidal or V-shapped in cross-section with an apex angle $\alpha$ typically equal to 30°. In other embodiments, the cross-section of the ring grooves is semi-circular or square in shape.

Figure 3:
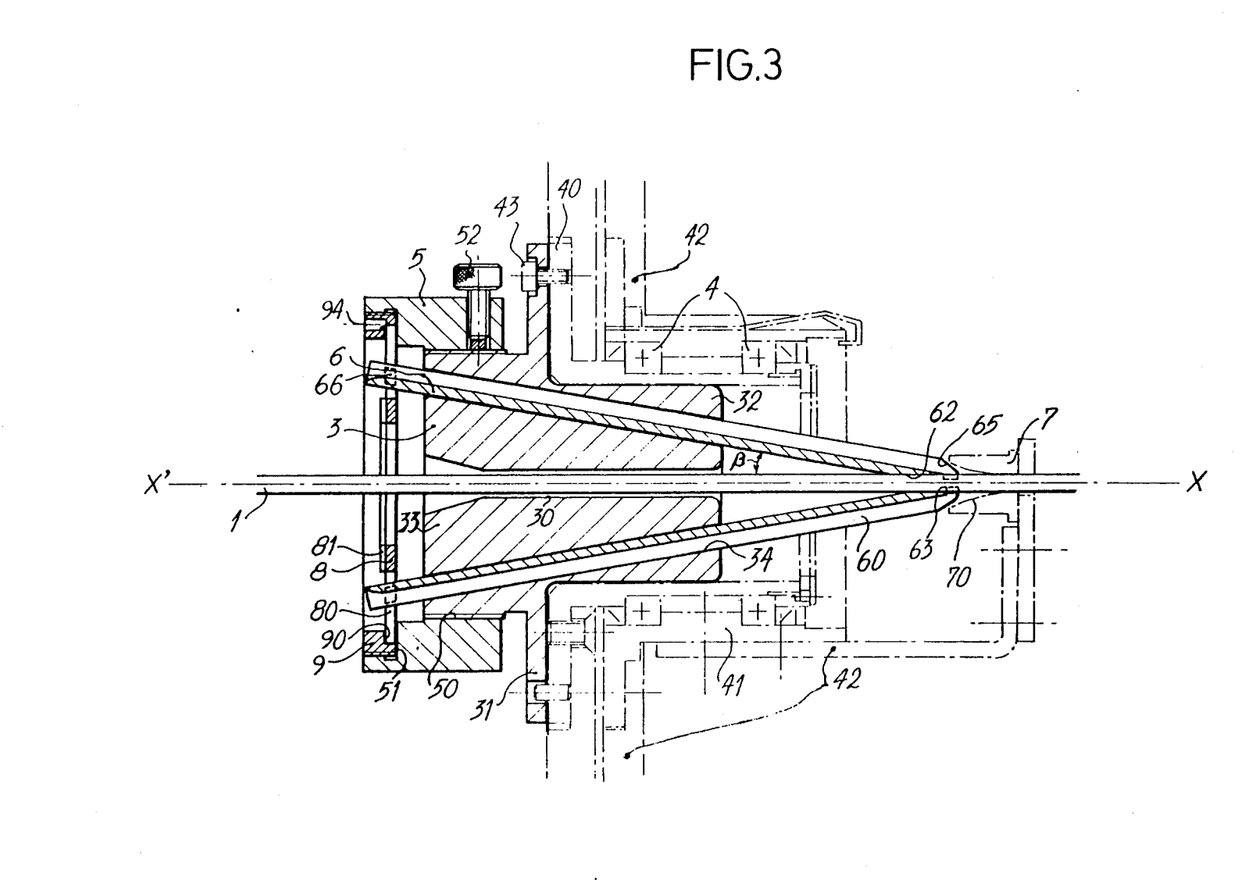
FIG. 3 is an axial cross-sectional view of a dispensing device embodying the invention.

With reference now to FIG. 3, an optical fiber dispensing device DI embodying the invention comprises a fiber-guide holder 3 generally cylindrical in shape about the horizontal axis X'X. Ring 1 runs freely through an axial cylindrical hole 30 of holder 3 having truncated ends. Holder 3, on either side of a collar 31, carries a smooth front cylindrical portion 32 and a threaded rear cylindrical portion 33. Front section 32 is inserted into a inner race 40 of a double ball bearing 4 forming a journal, an outer race 41 of ball bearing 4 being secured to a stationary frame 42. Collar 31 is secured against a rear shoulder on the inner race 40 by screws 43. Rear portion 33 is intended to take a tapped bore 50 of a knurled sleeve 5.

Figure 4:
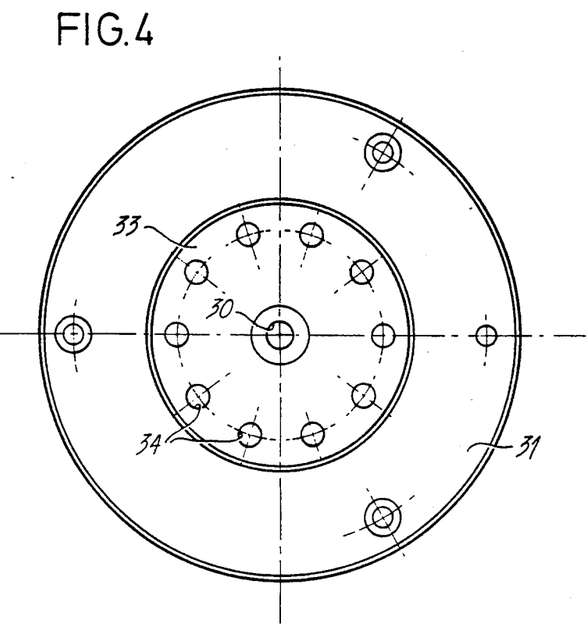
FIGS. 4 and 5 are respectively a rear-side view and an axial cross-sectional view of a fiber-guide holder embodying the invention.
Figure 5:
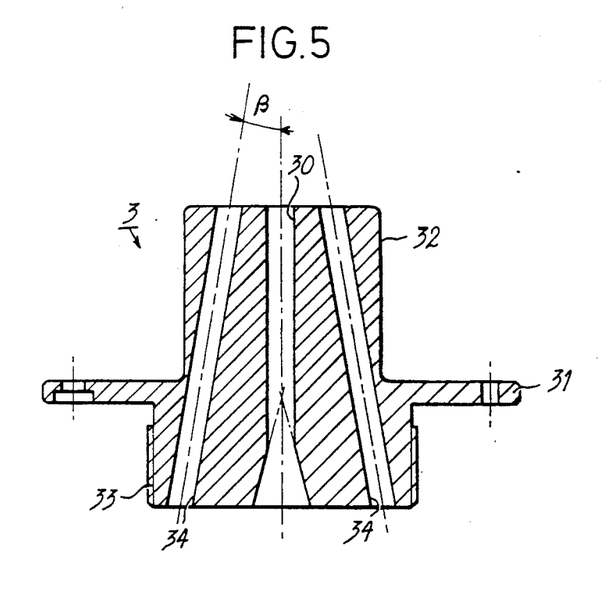
Figure 6:
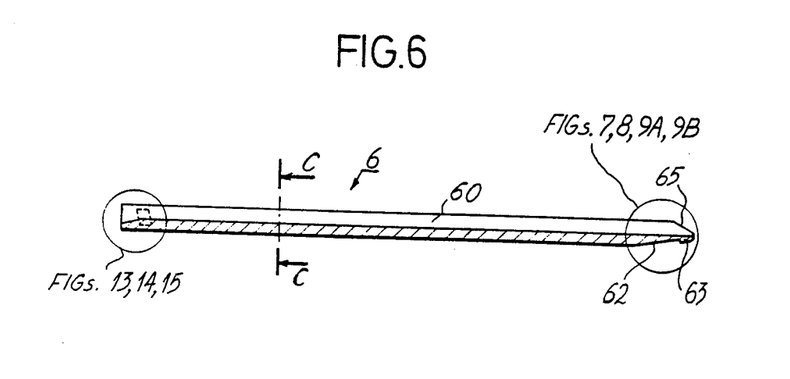
FIG. 6 is an axial cross-sectional side view of a fiber-guide embodying the invention.
Figure 7A:
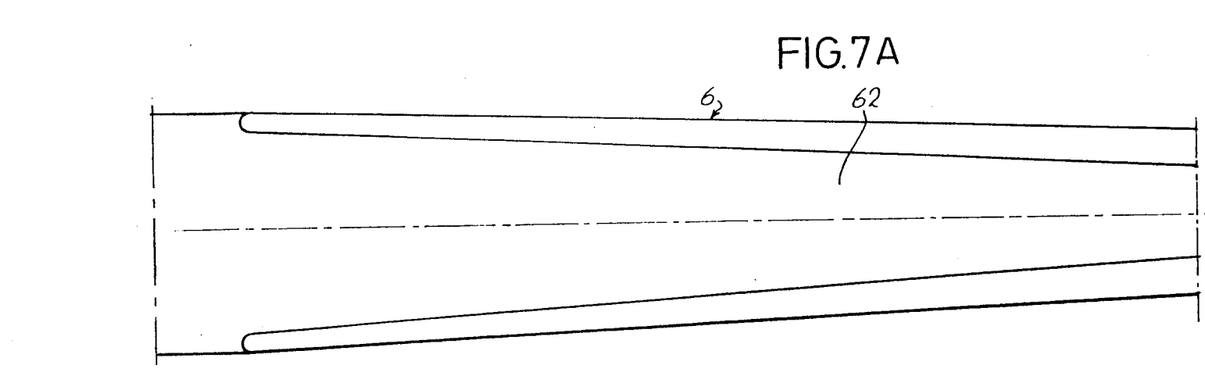
FIGS. 7A, 7B, and 8A, 8B are respectively longitudinal plan and axial cross-sectional views showing a first end at the front of a fiber-guide.
Figure 7B:
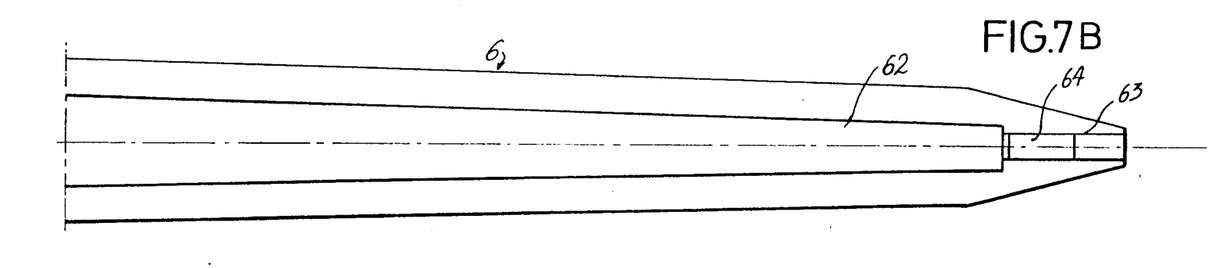

As illustrated in FIGS. 4 and 5, N rectilinear cylindrical conduits 34 are run in holder 3 such that they are coaxial with generating lines of a cone centered on the axis X'X, and hence coaxial with ring 1, and forming an apex half-angle $\beta$ typically equal to 10°. Conduits 34 are equally spaced out around the axis X'X and convergent on the front of holder 3.

In each conduit 34, a fiber-guide 6 is slidably mounted. As shown in FIGS. 6 to 9C, fiber-guide 6 is obtained from a solid stainless steel cylinder having a diameter equal to the diameter of the conduits 34, typically on the order of 5 mm. In the fiber-guide runs a longitudinal groove 60 having a cross-section significantly greater than a fiber cross-section. Typically, at least one transverse size, width or depth, of the groove cross-section is much greater than twice the outside diameter of an optical fiber cladding, approximately 0.2 mm. In the illustrated embodiment, the cross-section of groove 60 is V-shaped within a circular sector of typically 45°. Grooves 60 are hence very wide compared to the diameter of an optical fiber and cannot be obstructed with dust. The cross-section of grooves 60 form arrow-heads oriented towards the axis X'X. Grooves 60 are thus open outwards from the above-mentioned cone, thereby easing optical fiber laying in the fiber-guides. Fiber-guides 6 have a length substantially equal to twice the length of holder 3.

Figure 8A:
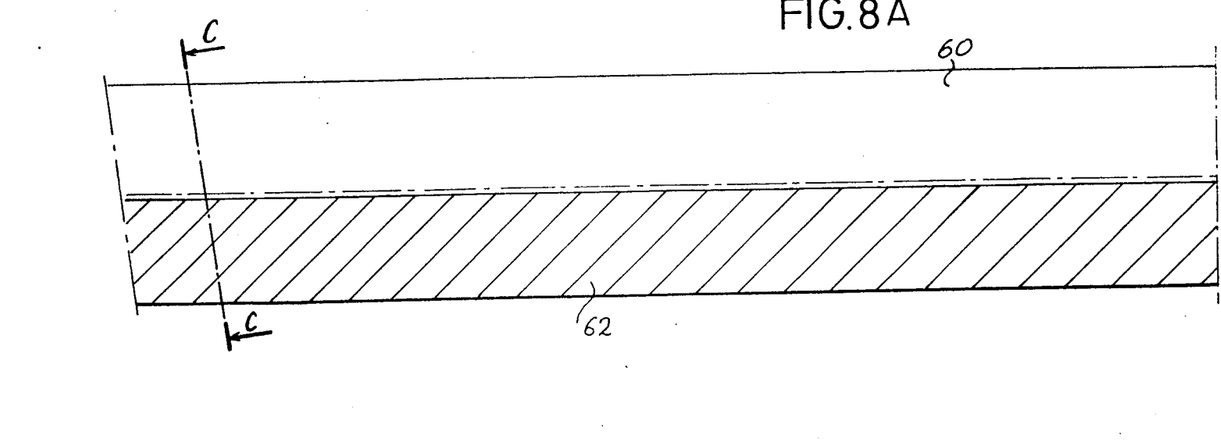
Figure 8B:
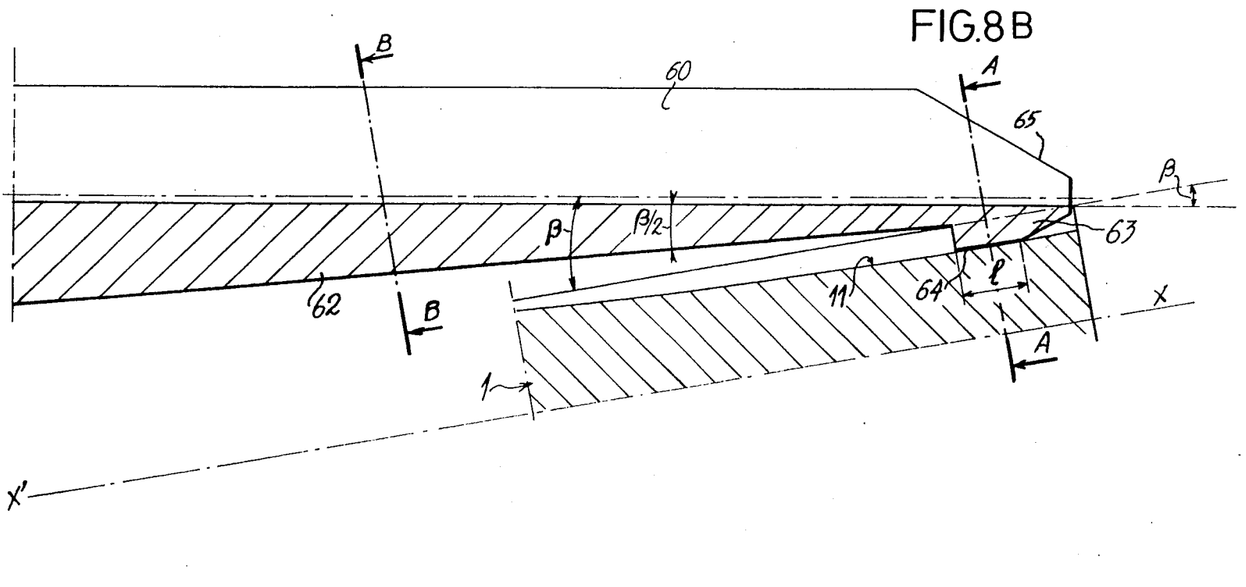
Figure 9A:
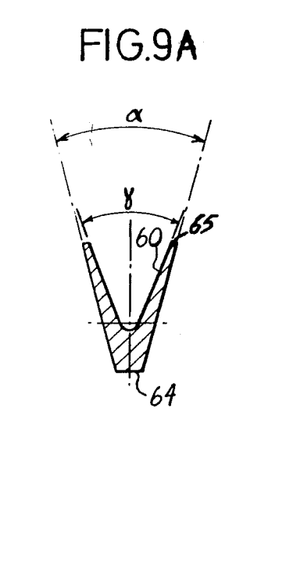
FIGS. 9A, 9B and 9C are transversal sections of the first end of the fiber-guide taken along lines AA, BB and CC in FIGS. 8A and 8B respectively.
Figure 9B:
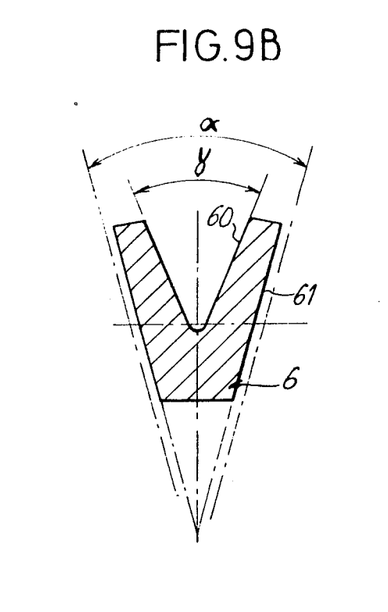
Figure 9C:
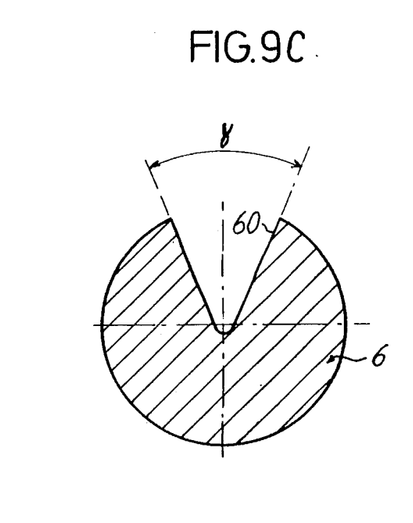

As depicted in FIGS. 7A, 7B, 8A, 8B, 9A and 9B, each fiber-guide 6 is tapered towards the nose both laterally and above and below the V-shaped groove 60. A front end of the fiber-guide offers an external section 61 similar in profile to the grooves 11 in ring 1. In the embodiment shown, the external section 61 is a blunted V having an apex angle $\alpha$ equal to that of ring grooves 11 and smaller than an apex angle $\gamma$ of the groove 60 in the fiber-guide. External section 61 of fiber-guide 6 and the section of the groove 60 are aligned along a fiber-guide longitudinal plane of symmetry. Provided subjacent to the front of the groove 60 and perpendicular to the plane of symmetry is a chamfer 62 forming an angle smaller than $\beta$ with the longitudinal axis of the fiber-guide, typically equal to $\beta/2$, that finishes in a protruding longitudinal finger 63. Finger 63 offers a longitudinal cross-section as a substantially rectangular trapezium having a height equal to the depth of the ring grooves 11, as shown in FIGS. 8A and 8B. Finger 63 carries a transverse cross-section matching the V-shaped profile and a ring groove 11. When the fiber-guide 6 slides in the conduit 34 of the holder 3 towards the ring 1, a lower edge 64 of the finger 63 lies parallel to the axis X'X and butts against the bottom of the corresponding groove 11. The bottom of the front end of the groove 60 is then on the periphery of the ring. Only the finger 63 comes into contact with the ring 1 over a very short length l, approximately 3 mm, as a result of the helical path of the groove 11. Preferably, the finger 63 with the axis X'X of the ring 1 forms an angle such that the lateral surface of the finger lies tangential to the helical surface of the groove 11; in other words, the finger 63 is substantially twisted and follows the helical path of the groove 11 perfectly. Furthermore, chamfer 62 stands proud of ring 1.

On the opposite side to the finger 63, the front end of the fiber-guide 6 is beveled to form an overlying chamfer 65 making an angle of around 30° with the fiber-guide axis. Chamfer 65 is swallowed by a rear convex truncated portion 70 of a bore through a revolution quill 7 that is secured to frame 42 and through which ring 1 freely runs, as shown in FIG. 3. In another embodiment, the quill can be rotatably mounted on and integral with the holder 3 or the inner race 40. Portion 70 turns fibers 2 leaving grooves 60 in fiber-guides 6 over grooves 11 in ring 1 respectively.

Figure 10:
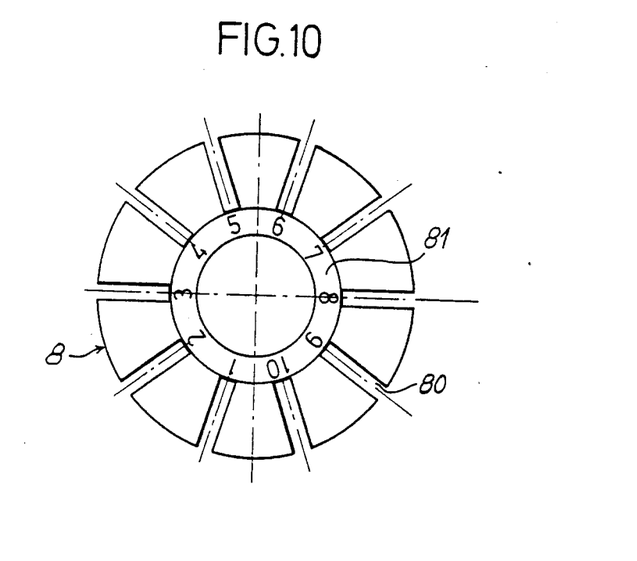
FIG. 10 is a rear-side view of a plate having radial slots to receive rear tenons of the fiber-guides and bearing a fiber locating label.
Figure 11:
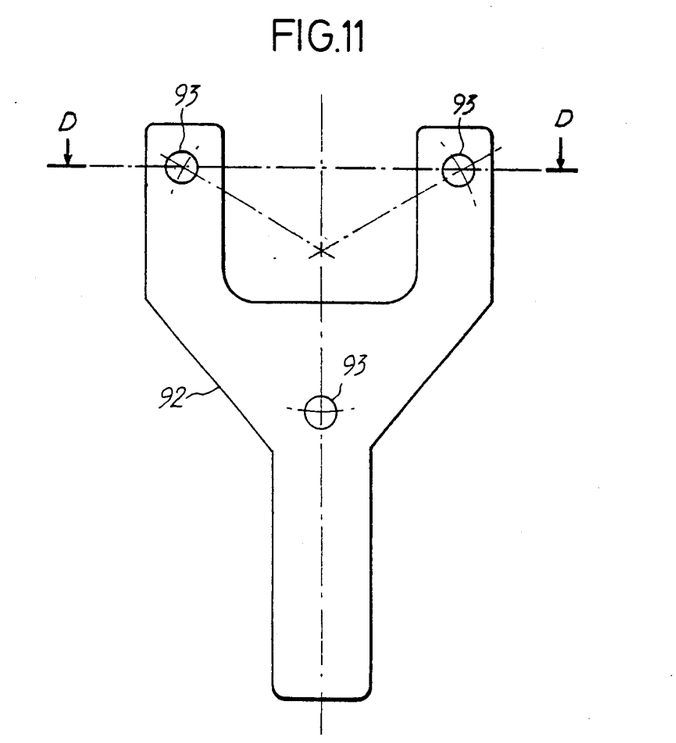
FIGS. 11 and 12 are respectively a front view and a cross-sectional view taken along line DD in FIG. 11 of a flat spanner for securing the plate.
Figure 12:
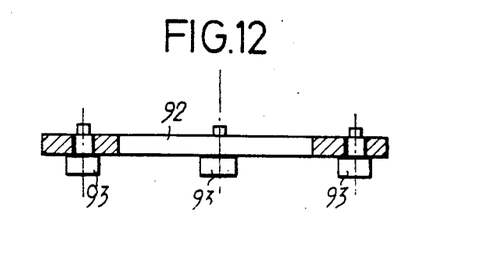

Rearward ends of fiber-guides 6 are held steady translationally with respect of the direction X'X in which ring 1 runs, by means in particular of a thin plate 8 shown in FIGS. 3 and 10. Plate 8 is a washer having a circular edge held axially with play in a circular groove formed between an inner surface 51 of a rear tapped spot-facing in the knurled sleeve 5 and a front spot-facing 90 of a threaded disk 9, assembled sleeve 6 and disk 9 forming a nut to be screwed to holder portion 33. Disk 9 is screwed into the tapped spot-facing of the sleeve 5 by means of a flat spanner 92 shown in FIGS. 11 and 12. The spanner carries three pegs 93 located at the corners of an equilateral triangle to cooperate with three blind holes 94 in the disk 9, as depicted in FIG. 3. When disk 9 has been fully screwed into sleeve 5, plate 8 is held with play in the circular groove along the longitudinal direction X'X.

Figure 13:
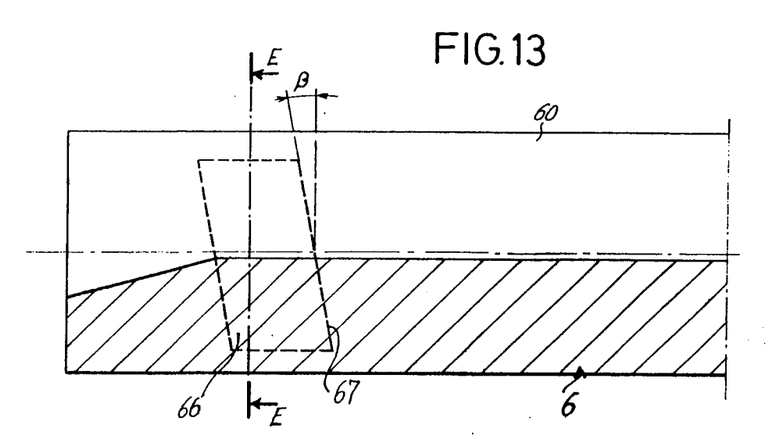
FIGS. 13 and 14 are respectively axial cross-sectional and plan views showing a second end at the rear of a fiber-guide.
Figure 14:
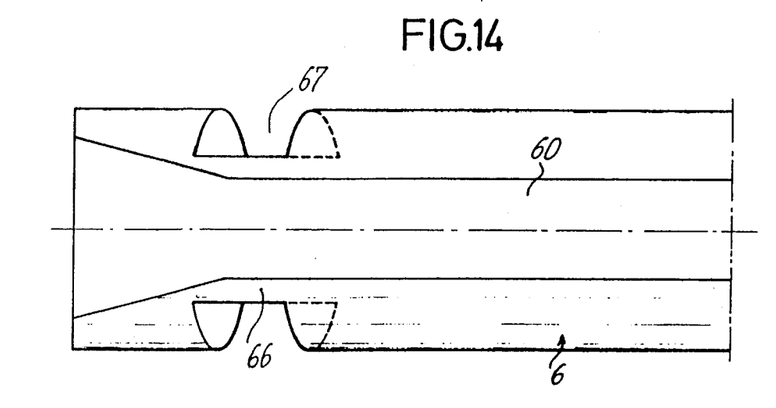
Figure 15:
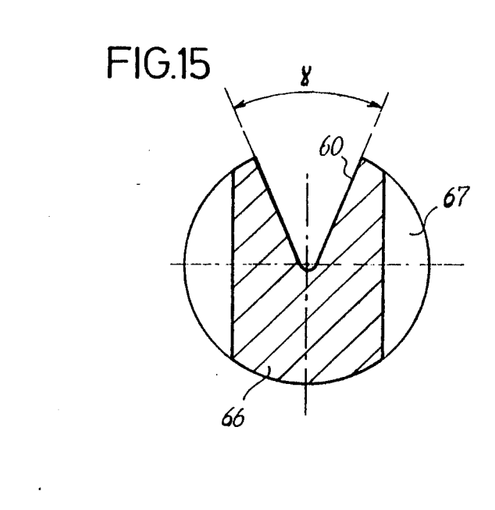
FIG. 15 is a transversal section of the second end of the fiber-guide taken along line EE in FIG. 13.

Plate 8 carries N radial slots 80 equally spaced out in a circular plane. Each slot 80 accommodates a tenon 66 complementary thereof, formed at the rear end of a fiber-guide 6, substantially in the region of a rear flared portion in the groove 60, as shown in FIGS. 13, 14 and 15. Tenon 66 has two parallel side walls on either side of the plane of symmetry of the V-shaped groove 60, thereby forming bottoms of two notches 67 having lateral walls inclined with respect to a diametral cross-section of the fiber-guide at an angle $\beta$, as depicted in FIG. 13. Fiber-guides 6 are linked to plate 8 along the longitudinal direction X'X as a result of notches 67 fitting around the surfaces of plate 8.

When plate 8 is moved translationally along the axis X'X, tenons 66 slide radially in slots 80 and fiber-guides 6 slide in conduits 34 along the generating lines of the cone already mentioned. An axial translation of plate 8 is achieved either when the members making up the dispensing device are assembled or during cabling line adjustment or maintenance operations, in either case by screwing sleeve 5 about threaded rear portion 33 of holder 3, where plate 8 remains rotationally still. More particularly, prior to feeding grooved ring 1 along the axis X'X of the cabling line and to freely slipping the ring through the bores in holder 3 and quill 7, sleeve 5 is substantially unscrewed to move fiber-guides 6 back and spread fingers 63 that open then a circular passage larger than one cross-section area of ring 1. Once ring 1 has been duly fed in, sleeve 5 is tightened about portion 33 until the fingers 63 enter ring grooves 11 respectively. Sleeve 5 is then held in this position by a radial locking screw 52 butting against threaded portion 33. Fibers 2 are unwound from pay-out spools BO, fed into grooves 60 of fiber-guides 6 and laid into grooves 11 in ring 1 via rear truncated bore 70 of quill 7. The ends of the fibers are bonded in the ring grooves. The dispensing device is then ready for the cabling operation itself. The freely assembled arrangement of plate 8 in the circular groove between the facings 51 and 90 permits free rotation of tapped sleeve 5 and further forward and backward movement of fiber-guides 6.

Preferably, as already stated, holder 3 containing fiber-guides 6 is integral with rotating holder SU on which the fiber pay-out spools BO are rotatably mounted, by means of a tube TU (FIG. 1). Furthermore, grooved ring 1 forming central core of an optical fiber cable includes coloured marker ribs between grooves obtained in a ring manufacturing device comprising a main extruder and at least one auxiliary extruder as described in European patent application No. 0,078,213 corresponding to U.S. patent application Ser. No. 437,310 filed Oct. 28, 1982, now U.S. Pat. No. 4,548,567. By way of an example, as depicted in FIG. 2, ring 1 comprises a first coloured rib 12a, a third coloured rib 12b and a fourth coloured rib 12c viewed clockwise. Ribs 12a, 12b and 12c are of a particular colour, e.g. yellow, that is not the same as the ring 1, e.g. red. It is therefore easy to identify and ascribe a ring groove 11 thus marked to a pay-out spool BO by means of numbered label 81 affixed to the rear surface of plate 8, as shown in FIGS. 3 and 10. N numbers, varying between 1 and 10 here, are recorded on label 81 and are equally spaced out in a circle beneath slots 80 in plate 8. In another embodiment, the N numbers are engraved directly on the rear surface of plate 8.

When the ring is fed along the axis X'X, pay-out spool holder SU and holder 3 with fiber-guides 6 having fingers 63 recessed with respect to ring 1 stay rotationally still. Coloured ribs 12a, 12b and 12c are thus placed between fingers marked with the foregoing numbers on label 81. The above relative positioning between the fiber-guides, and hence fiber pay-out spools BO, and ring grooves 11 is maintained when sleeve 5 is screwed around portion 33, whilst plate 8 with label 81 is simply translationally moved forwards. Under these conditions, such a marking on fibers 2 in grooves 11 can be reiterated in an identical fashion for various ring sections to be cabled. In particular, for an optical fiber transmission link requiring several ring sections to be connected together, one and the same optical fiber conveys a same optical signal. Should one of the fibers in the cable fail mechanically, it is possible to locate the fibers easily and compare their characteristics, it being known that the fibers sections in a given groove in the various ring sections are issued from the same spool and hence emanate the same fiber manufactured on a continuous basis.

What we claim is:

1. A device for dispensing optical fibers in helical peripheral grooves in a cylindrical ring, comprising
   (a) a holder containing an axial through bore within which the ring freely runs, said holder including a plurality of conduits arranged along generating lines of a cone coaxial with the ring;
   (b) hollow, elongated fiber-guide means slidably mounted in each of said holder conduits, respectively, said fiber-guide means including first fiber-output ends and second fiber-input ends, each of said fiber guide means receiving at least one optical fiber from said fiber-input end to said fiber-output end; and
   (c) means connected with said holder and radially slidably linked to said fiber-input ends of fiber-guide means for imparting translational movement to said fiber-guides in said conduits along said generating lines of said cone, respectively, thereby engaging said fiber-output ends of said fiber-guides into the ring grooves to rotatably link said holder with the ring.

2. A device for dispensing optical fibers in helical peripheral grooves in a cylindrical ring, comprising
   (a) a holder member adapted for rotation about the ring, said holder member including a plurality of conduits;
   (b) fiber-guide means arranged in each of said holder conduits, respectively, for receiving at least one optical fiber, said fiber-guide means being arranged along generating lines of a cone coaxial with the ring and having first fiber output ends adapted for engagement within the ring grooves and being slideably mounted within said holder conduits and second tenon-shaped ends;
   (c) washer means including a plurality of radial slots for receiving said fiber-guide second tenon-shaped ends, respectively, said washer means imparting translational movement to said fiber-guides along said generating lines of said cone, respectively; and
   (d) nut means threadably connected with said holder member and including an annular groove for enclosing a circular edge of said washer means.

3. The device claimed in claim 2 wherein said nut means includes a tapped sleeve screwed onto a threaded portion of said holder, and a threaded hollow disk screwed into a tapped facing of said sleeve thereby locking said washer with play in said sleeve.

4. The device claimed in claim 2 wherein said nut means is locked on said holder by means of a radial locking means.

5. The device claimed in claim 2 wherein markings are engraved beneath said slots on said washer.

6. The device claimed in claim 2 wherein markings are recorded beneath said washer slots on a circular label affixed to said washer.

7. The device claimed in claim 1 wherein each of said fiber-guides has a longitudinal groove having a cross-section analogous with a cross-section of a groove in said ring and open opposite said ring to receive at least one optical fiber.

8. The device claimed in claim 7 wherein said cross-section of said fiber-guide grooves is much greater than a cross-section of said optical fibers.

9. The device claimed in claim 7 wherein said cross-section of said fiber-guide grooves is V-shaped.

10. The device claimed in claim 9 wherein said V-shaped cross-section of said fiber-guide grooves is included in a circular sector having an angle substantially equal to 45°.

11. A device for dispensing optical fibers in helical peipheral grooves in a cylindrical ring, comprising
 (a) a holder member adapted for rotation about the ring, said holder member including a plurality of conduits;
 (b) hollow fiber-guide means arranged in each of said holder conduits, respectively, said fiber-guide means being arranged along generating lines of a cone coaxial with the ring and having first fiber output ends adapted for engagement within the ring grooves and being slidably mounted within said holder conduits, said fiber-guide means further containing a longitudinal groove having a cross-sectional configuration analagous with the cross-sectional configuration of one of the ring grooves and being open opposite the ring for receiving at least one optical fiber;
 (c) means for imparting translational movement to said fiber-guide means along said generating lines of said cone, respectively; and
 (d) a revolution member containing a bore through which the ring runs and which overlaps the end edges of said fiber-guide grooves for laying said fibers in the ring grooves.

12. The device claimed in claim 11 wherein said end edges of said fiber-guide grooves are chamfered, and said revolution member bore is truncated.

13. A device for dispensing optical fibers in helical peripheral grooves in a cylindrical ring, comprising
 (a) a holder member adapted for rotation about the ring, said holder member including a plurality of conduits;
 (b) hollow fiber-guide means arranged in each of said holder conduits, respectively, for receiving at least one optical fiber, said fiber-guide means being arranged along generating lines of a cone coaxial with the ring and having first fiber output ends including a finger portion conforming with and adapted for engagement within the ring grooves and being slidably mounted within said holder conduits to define with the longitudinal axis of said fiber-guide means an angle equal to half an apex angle of said cone; and
 (c) means for imparting translational movement to said fiber-guide means along said generating lines of said cone, respectively.

14. A device for dispensing optical fibers in helical peripheral grooves in a cylindrical ring, comprising
 (a) a holder member adapted for rotation about the ring, said holder member including a plurality of conduits;
 (b) hollow fiber-guide means arranged in each of said holder conduits, respectively, for receiving at least one optical fiber, said fiber-guide means being arranged along generating lines of a cone coaxial with the ring and having first fiber output ends including a finger portion conforming with and adapted for engagement within the ring grooves and being slidably mounted within said holder conduits to define with the longitudinal axis of said fiber-guide means an angle such that lateral surfaces of said finger are tangential to helical surfaces of the ring groove; and
 (c) means for imparting translational movement to said fiber-guide means along said generating lines of said cone, respectively.

15. A device for dispensing optical fibers in helical peripheral grooves in a cylindrical ring, comprising
 (a) a holder member adapted for rotation about the ring, said holder member including a plurality of conduits;
 (b) hollow fiber-guide means arranged in each of said holder conduits, respectively, said fiber-guide means being arranged along generating lines of a cone coaxial with the ring and having first fiber output ends adapted for engagement within the ring grooves and being slidably mounted within said holder conduits, said fiber-guide means further containing a longitudinal groove having a crosssectional configuration analogous with the crosssectional configuration of one of the ring grooves and being open opposite the ring for receiving at least one optical fiber, said first end of each of said fiber guide means including a finger portion conforming with the ring grooves and a subjacent chamber portion rearward of said finger portion, recessed with respect thereto, and standing proud of the ring such that the end of said fiber-guide groove lies on the periphery of the ring; and
 (c) means for imparting translational movement to said fiber-guide means along said generating lines of said cone, respectively; and

* * * * *